United States Patent
Bestfleisch

(10) Patent No.: US 10,558,663 B2
(45) Date of Patent: Feb. 11, 2020

(54) AUTOMATED APPLICATION OF QUERY HINTS

(71) Applicant: SAP SE, Walldorf (DE)

(72) Inventor: Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 421 days.

(21) Appl. No.: 15/474,473

(22) Filed: Mar. 30, 2017

(65) Prior Publication Data

US 2018/0285416 A1 Oct. 4, 2018

(51) Int. Cl.
*G06F 7/00* (2006.01)
*G06F 17/30* (2006.01)
*G06F 16/2453* (2019.01)
*G06F 16/2455* (2019.01)

(52) U.S. Cl.
CPC .. *G06F 16/24542* (2019.01); *G06F 16/24552* (2019.01)

(58) Field of Classification Search
None
See application file for complete search history.

(56) References Cited

U.S. PATENT DOCUMENTS

| 7,987,178 B2 * | 7/2011 | Hueske | G06F 16/217 707/713 |
| 2010/0306188 A1 * | 12/2010 | Cunningham | G06F 16/24542 707/713 |
| 2014/0317084 A1 * | 10/2014 | Chaudhry | G06F 16/24552 707/713 |
| 2015/0347506 A1 * | 12/2015 | Annapragada | G06F 16/24542 707/718 |

* cited by examiner

*Primary Examiner* — Tuan A Pham
(74) *Attorney, Agent, or Firm* — Fountainhead Law Group P.C.

(57) ABSTRACT

Some embodiments provide a non-transitory machine-readable medium that stores a program. In response to receiving a first query for a set of data, the program generates a first query execution plan based on the first query. The program further executes the first query execution plan in order to generate a first result set comprising the set of data. The program also stores the first query execution plan in a cache. The program further replaces the first query execution plan in the cache with a second query execution plan. The second query execution plan includes a query hint applied to the first query execution plan. In response to receiving a second query for the set of data, the program also retrieves the second query execution plan from the cache. The program further executes the second query execution plan in order to generate a second result set comprising the set of data.

20 Claims, 11 Drawing Sheets

| ID | Statement Hash | Statement Pattern | Query Hint |
|---|---|---|---|
| 1 | dadbba944fdd1a9c | | Query Hint 1 |
| 2 | 6773a42a9b48086c | | Query Hint 2 |
| 3 | | * from "Table B" * | Query Hint 3 |
| 4 | | * from "Table D" * | Query Hint 4 |
| 5 | 5c67769c4888a1d9 | | Query Hint 5 |
| 6 | | * from "Table F" * | Query Hint 6 |

AUTOMATED APPLICATION OF QUERY HINTS

BACKGROUND

A relational database management system (RDBMS) is one of many ways in which large amounts of data can be managed and stored. Queries, such as structured query language (SQL) queries, may be used to access data in an RDBMS. To process such a query, the RDBMS may parse the query and generate one or more query execution plans for accessing the requested data. The RDBMS may select one of the generated query plans and then execute the query execution plan in order to generate results for the query.

SUMMARY

In some embodiments, a non-transitory machine-readable medium stores a program. In response to receiving a first query for a set of data, the program generates a first query execution plan based on the first query. The program further executes the first query execution plan in order to generate a first result set comprising the set of data. The program also stores the first query execution plan in a cache. The program further replaces the first query execution plan in the cache with a second query execution plan. The second query execution plan includes a query hint applied to the first query execution plan. In response to receiving a second query for the set of data, the program also retrieves the second query execution plan from the cache. The program further executes the second query execution plan in order to generate a second result set comprising the set of data.

In some embodiments, before generating the first query execution plan, the program may further parse the first query. Before retrieving the second query execution plan, the program may also parse the second query. The first query may be received from an application. The program may further send the first result set to the application. The application may be a first application. The second query may be received from a second application. The program may further send the second result set to the second application.

In some embodiments, replacing the first query execution plan with the second query execution plan may be based on a mapping between a hash value of the query first execution plan and a query hint. Replacing the first query execution plan with the second query execution plan may be based on a mapping between a query statement pattern and a query hint. Replacing the first query execution plan with the second query execution plan may be automatedly performed during runtime without human intervention.

In some embodiments, in response to receiving a first query for a set of data, a method generates a first query execution plan based on the first query. The method further executes the first query execution plan in order to generate a first result set comprising the set of data. The program also stores the first query execution plan in a cache. The program further replaces the first query execution plan in the cache with a second query execution plan. The second query execution plan includes a query hint applied to the first query execution plan. In response to receiving a second query for the set of data, the program also retrieves the second query execution plan from the cache. The program further executes the second query execution plan in order to generate a second result set comprising the set of data.

In some embodiments, before generating the first query execution plan, the method may further parse the first query. Before retrieving the second query execution plan, the method may also parse the second query. The first query may be received from an application. The method may further send the first result set to the application. The application may be a first application. The second query may be received from a second application. The method may further send the second result set to the second application.

In some embodiments, replacing the first query execution plan with the second query execution plan may be based on a mapping between a hash value of the query first execution plan and a query hint. Replacing the first query execution plan with the second query execution plan may be based on a mapping between a query statement pattern and a query hint. Replacing the first query execution plan with the second query execution plan may be automatedly performed during runtime without human intervention.

In some embodiments, a system includes a set of processing units and a non-transitory computer-readable medium that stores instructions. In response to receiving a first query for a set of data. The instructions cause at least one processing unit to generate a first query execution plan based on the first query. The instructions further cause the at least one processing unit to execute the first query execution plan in order to generate a first result set comprising the set of data. The instructions also cause the at least one processing unit to store the first query execution plan in a cache. The instructions further cause the at least one processing unit to replace the first query execution plan in the cache with a second query execution plan. The second query execution plan includes a query hint applied to the first query execution plan. In response to receiving a second query for the set of data, the instructions also cause the at least one processing unit to retrieve the second query execution plan from the cache. The instructions further cause the at least one processing unit to execute the second query execution plan in order to generate a second result set comprising the set of data.

In some embodiments, before generating the first query execution plan, the instructions may further cause the at least one processing unit to parse the first query. Before retrieving the second query execution plan, the instructions may also cause the at least one processing unit to parse the second query. The first query may be received from an application. The instructions may further cause the at least one processing unit to send the first result set to the application. The application may be a first application. The second query may be received from a second application. The instructions may further cause the at least one processing unit to send the second result set to the second application.

In some embodiments, replacing the first query execution plan with the second query execution plan may be based on a mapping between a hash value of the query first execution plan and a query hint. Replacing the first query execution plan with the second query execution plan may be based on a mapping between a query statement pattern and a query hint.

The following detailed description and accompanying drawings provide a better understanding of the nature and advantages of the present invention.

BRIEF DESCRIPTION OF THE DRAWINGS

FIG. 2 illustrates example mappings between query statement hashes and query hints and example mappings between query statement patterns and query hints according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system that automatedly (e.g., without human intervention) applies query hints to query execution plan during runtime. In some embodiments, the system includes a cache configured to store query execution plans. When processing a query, the system may access the cache to determine whether the cache includes a query execution plan for the query. If one exists in the query, the system uses the query execution plan to process the query. Otherwise, the system generates a query execution plan for the query. During runtime, the system may periodically analyze query execution plans stored in the cache and apply query hints to the query execution plans. This way, when the system receives a query and the cache has a query execution plan for the query, the system can use the query execution plan for the query, which has one or more query hints applied to the query execution plan, stored in the cache to process the query.

In some embodiments, a query execution plan for a query is a set of operations that when executed retrieves data (e.g., a result set) for the query. In some such embodiments, a query hint is a set of instructions that may specify to include one or more operators (e.g., joins) and/or types of operators (e.g., types of joins) in a query execution plan for a query, specify to use a particular execution engine (e.g., an online analytical processing (OLAP) engine, a join engine, etc.) to execute the query execution plan for the query, specify to use or not use indexes in the query execution plan for the query, specify size sampling parameters for selecting a query execution plan for the query, specify parameters for rewriting the query, specify parameters for logical transformations of the query, etc.

Figure 1:
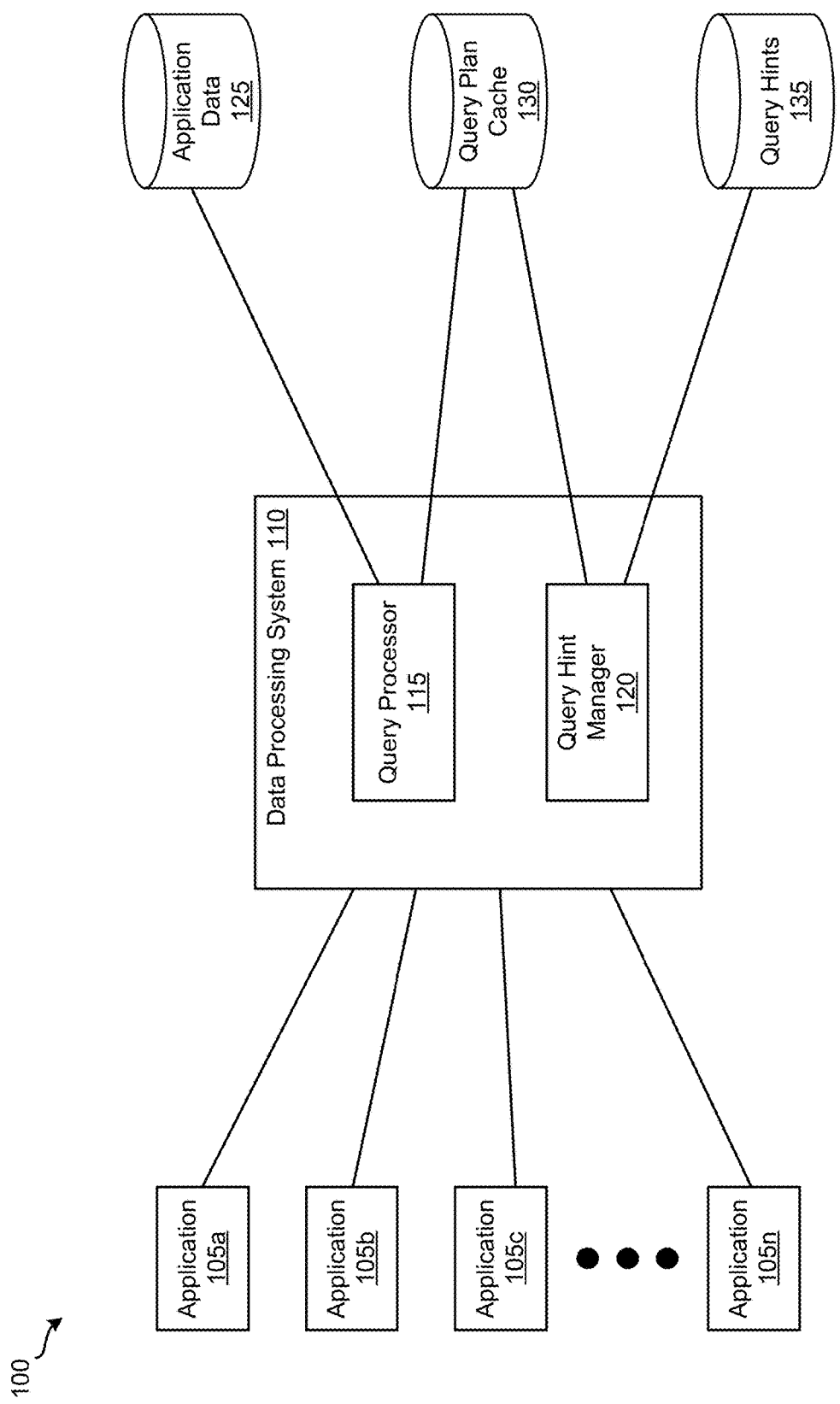
FIG. 1 illustrates a system according to some embodiments.

FIG. 1 illustrates a system 100 according to some embodiments. As shown, system 100 includes applications 105a-n, data processing system 110, and storages 125-135. Applications 105a-n are software applications/programs that each includes instructions for performing a set of tasks when executed by a computing device (e.g., a desktop computer, a server computer, a laptop, a tablet, a mobile computing device, etc.). For example, applications 105a-n may be configured to communicate with and request data from data processing system 110 (e.g., by sending data processing system 110 queries for data). In some embodiments, one or more applications 105a-n may operate on a computing device separate from a computing device on which data processing system 110 operates. In other embodiments, one or more applications 105a-n may operate on the same computing device on which data processing system 110 operates.

Application data storage 125 is configured to store data associated with applications 105a-n. Query plan cache storage 130 may store a cache of query execution plans. Query hints storage 135 is configured to store query hints that may be applied to query execution plans. Storages 125-135 may be relational databases, non-relational databases, or a combination thereof. In some embodiments, storages 125-135 are implemented in a single physical storage while, in other embodiments, storages 125-135 may be implemented across several physical storages. While FIG. 1 shows storages 125-135 as external to data processing system 110, one of ordinary skill in the art will appreciated that storages 125, 130, and/or 135 may be part of data processing system 110 in some embodiments.

Data processing system 110 is configured to process queries received from applications 105a-n for data in application data storage 125. As illustrated in FIG. 1, data processing system 110 includes query processor 115 and query hint manager 120. Query processor 115 is configured to process queries received from applications 105a-n. For instance, when query processor 115 receives a query from an application 105, query processor parses the query and then generates a query execution plan for the query. In some embodiments, a query execution plan for a query is an internal representation of the query. Next, query processor 115 executes the query execution plan (e.g., by accessing and retrieving data from application data storage 125) in order to generate a result set for the query. Then, query processor 115 sends the result set to the application 105.

Query hint manager 120 is responsible for applying query hints to query execution plans. For example, in some embodiments, query hint manager 120 may periodically (e.g., once per minute, once per hour, once per day, etc.) check the entries of query execution plans in query plan cache storage 130 and apply query hints to the query execution plans in query plan cache storage 130 based on mappings of query hints defined in query hints storage 135. The mappings stored in query hints storage 135 may include mappings between query statement hashes and query hints and/or mappings between query statement patterns and query hints. In some embodiments, a query statement pattern specifies a string pattern to use to search for strings defined by the string pattern in query statements. In some such embodiments, a query statement pattern can be defined using regular expression.

FIG. 2 illustrates example mappings between query statement hashes and query hints and example mappings between query statement patterns and query hints according to some embodiments. In particular, FIG. 2 illustrates table 200 that includes six mappings for query hints. As mentioned above, mappings between query statement hashes and query hints and/or mappings between query statement patterns and query hints. The first, second, and fifth mappings are examples of mapping between query statement hashes and query hints. The third, fourth, and sixth mappings are examples of mappings between query statement patterns and query hints.

Figure 3:
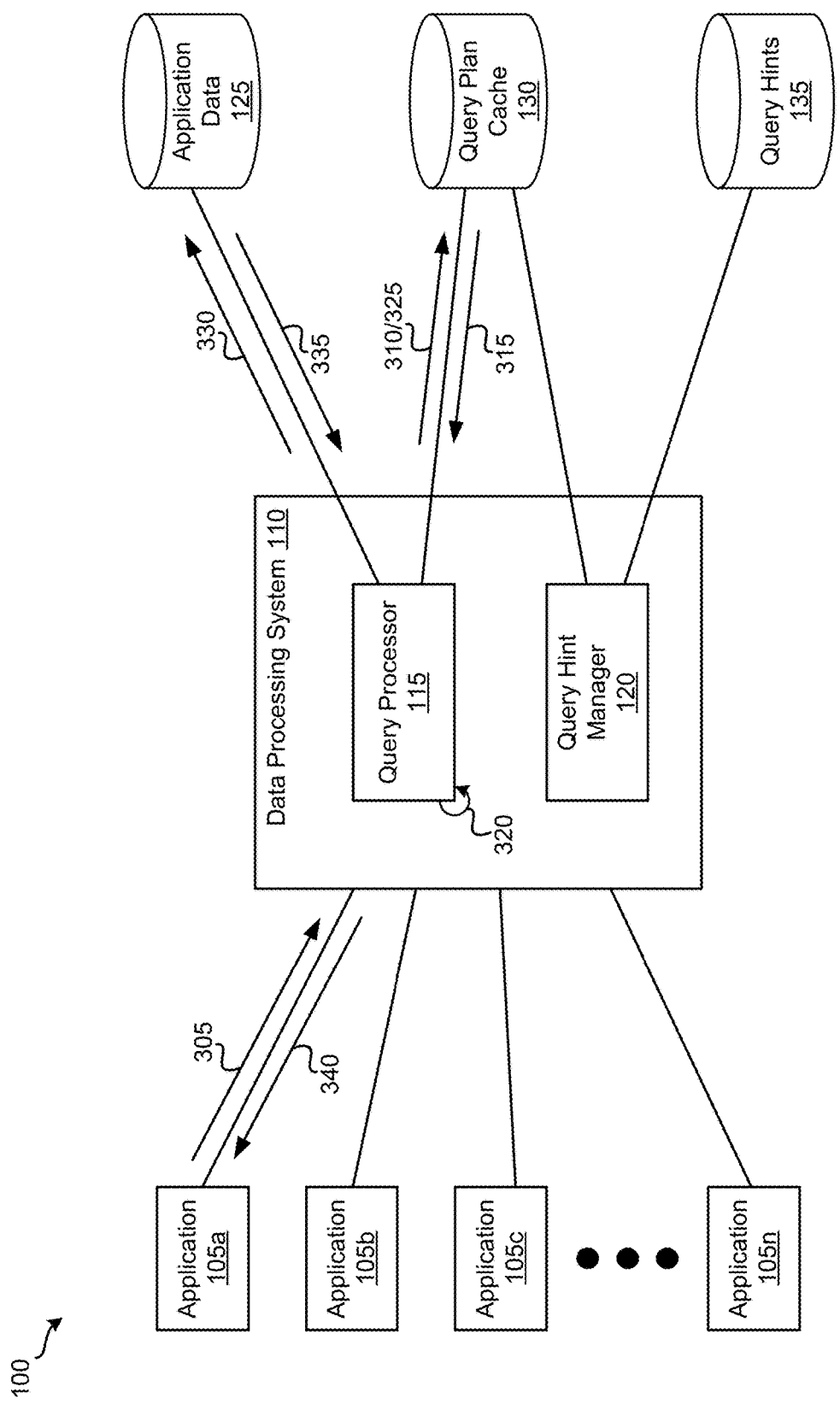
FIG. 3 illustrates an example query processing dataflow through the system illustrated in FIG. 1 according to some embodiments.
Figures 4A, 4B:
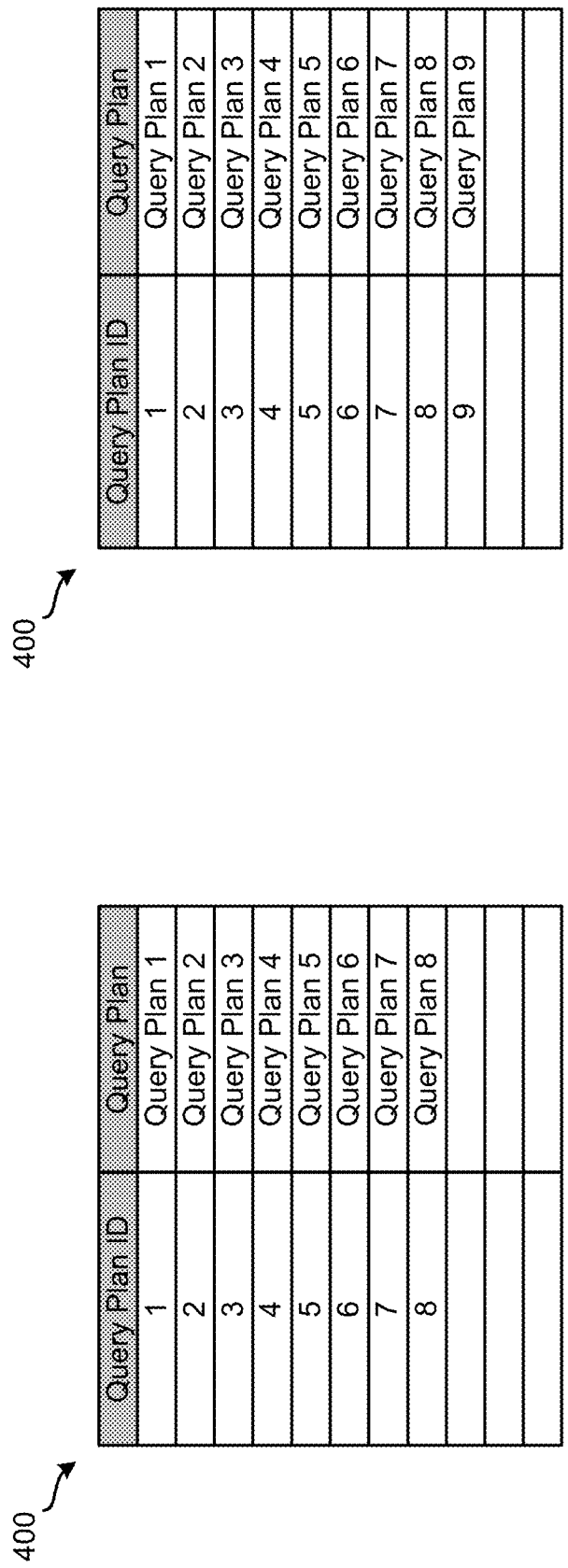
FIGS. 4A and 4B illustrate an example cache storing query execution plans according to some embodiments.

An example query processing dataflow will now be described by reference to FIGS. 3 and 4. Specifically, FIG. 3 illustrates an example query processing dataflow through the system illustrated in FIG. 1 according to some embodiments. FIGS. 4A and 4B illustrate an example cache 400 storing query execution plans according to some embodiments. At the start of this example, query plan cache storage 130 stores cache 400 shown in FIG. 4A. As shown, cache 400 includes eight query execution plans, Query Plans 1-8. The example query processing dataflow starts by application 105a sending, at operation 305, data processing system 110 a query for data from application data storage 125. Upon receiving the query, query processor 115 parses the query. Next, query processor 115 checks whether query plan cache storage 130 includes a query execution plan for the query by sending, at operation 310, query plan cache storage 130 a request, which includes a hash value of the query string, for a query execution plan associated with the query. If query plan cache storage 130 has a query execution plan with a hash value that matches the hash value of the query string, query plan cache storage 130 returns the query execution plan. Otherwise, query plan cache storage 130 sends a response that it does not have a query execution plan for the query. In this example, none of the hash values of Query Plans 1-8 match the hash value of the query string of the query. Thus, returning to FIG. 3, query plan cache storage 130 sends a response to query processor 115 indicating so.

Next, query processor 115 generates, at operation 320, a query execution plan for the query. Query processor 115 then sends, at operation 325, the query execution plan for the query to query plan cache storage 130 for storage and later use. FIG. 4B illustrates cache 400 after query plan cache storage 130 stores the query execution plan for the query. As illustrated, cache 400 now includes a ninth query execution plan (Query Plan 9 in this example) that is associated with the query. Returning to FIG. 3, query processor 115 executes the selected query execution plan by accessing, at operation 330, application data storage 125 and retrieving, at operation 335, a result set for the query. Finally, query processor 115 sends, at operation 340, the result set for the query to application 105a.

Figure 5:
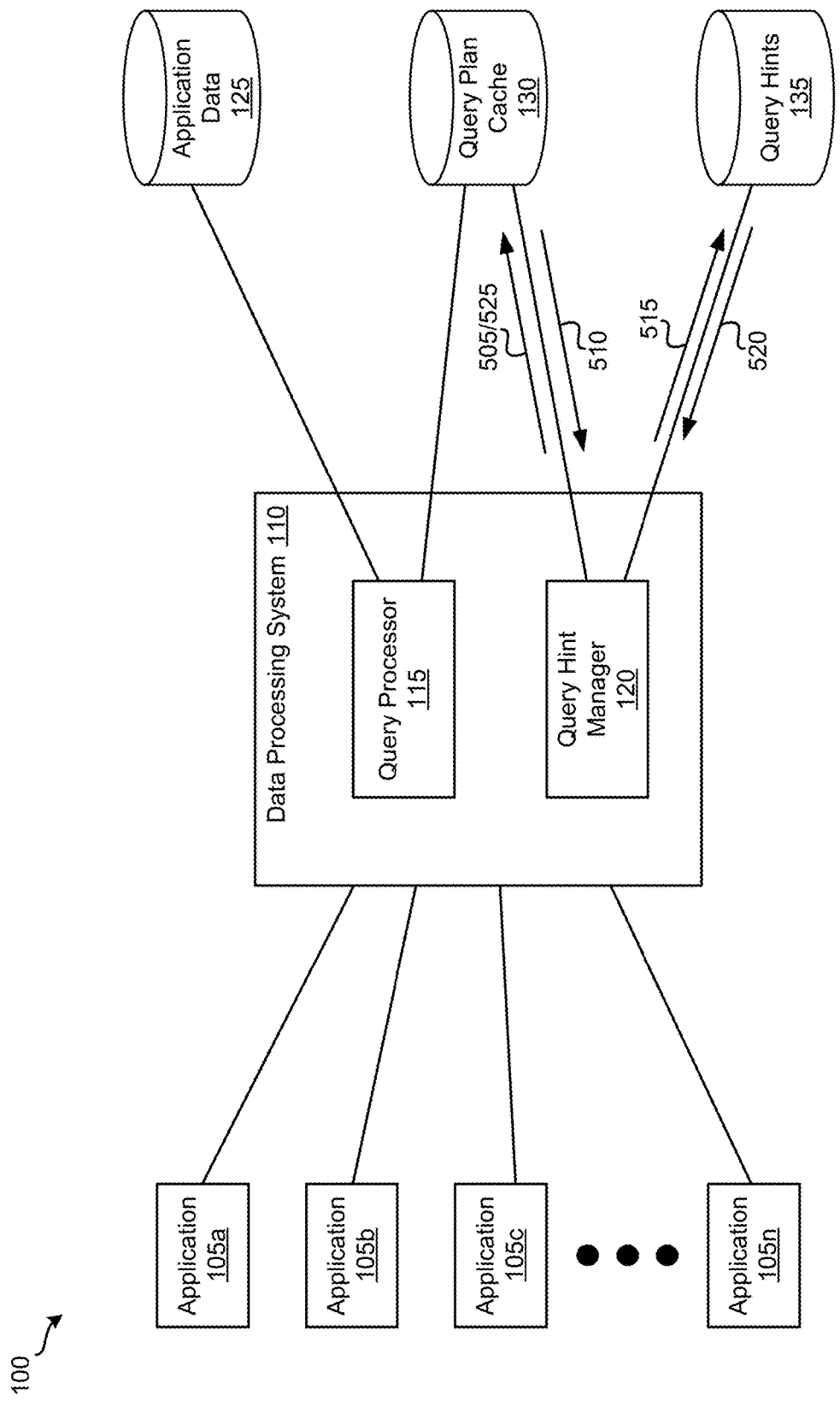
FIG. 5 illustrates an example query hint application dataflow through the system illustrated in FIG. 1 according to some embodiments.

An example query hint application dataflow will now be described by reference to FIGS. 2, 4, 5, and 6. In particular, FIG. 5 illustrates an example query hint application dataflow through the system illustrated in FIG. 1 according to some embodiments. In some embodiments, query hint manager 120 performs the dataflow illustrated in FIG. 5 for each query execution plan stored in query plan cache storage 130 at defined intervals (e.g., once a minute, once an hour, once a day, etc.). The example query hint application dataflow begins by query hint manager 120 sending, at operation 505, query plan cache storage 130 a query execution plan stored in query plan cache storage 130. In response, query plan cache storage 130 sends, at operation 510, a query execution plan to query hint manager 120.

Figure 6:
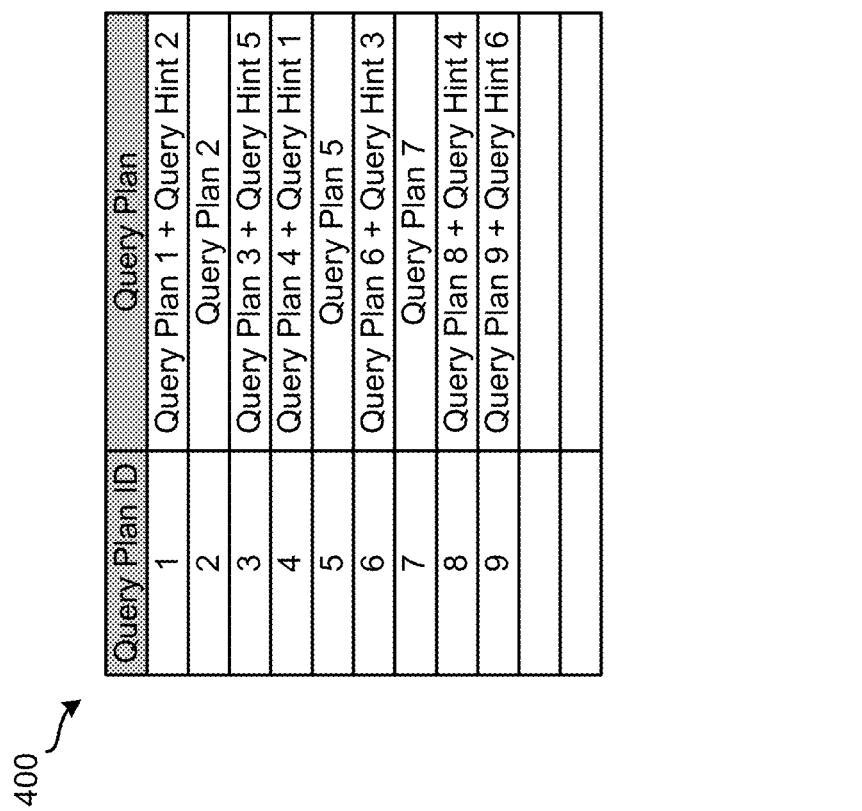
FIG. 6 illustrates the cache illustrated in FIGS. 4A and 4B after applying query hints to the cache according to some embodiments.

Next, query hint manager 120 sends, at operation 515, query hints storage 135 a request for mappings of query hints and, in response, query hints storage 135 sends, at operation 520, query hint manager 120 the mappings. In this example, the mappings illustrated in table 200 of FIG. 2 are the mappings stored in query hints storage 135. If the hash value of the query statement of the query execution plan matches a statement hash value and/or the query statement of the query execution plan matches a statement pattern specified in a mapping in table 200, query hint manager 120 sends, at operation 525, query plan cache storage 130 a request to replace the query execution plan with a version of the query execution plan with the query hint associated with the mapping applied to it. FIG. 6 illustrates cache 400 illustrated in FIGS. 4A and 4B after applying query hints to cache 400 according to some embodiments. Specifically, FIG. 6 shows cache 400 after querying hints are applied to cache 400 illustrated in FIG. 4B based on the mappings in table 200. As shown, for this example, Query Plan 1 matches the second mapping in table 200, Query Plan 3 matches the fifth mapping in table 200, Query Plan 4 matches the first mapping in table 200, Query plan 6 matches the third mapping in table 200, Query Plan 8 matches the fourth mapping in table 200, and Query Plan 9 matches the sixth mapping in table 200.

Figure 7:
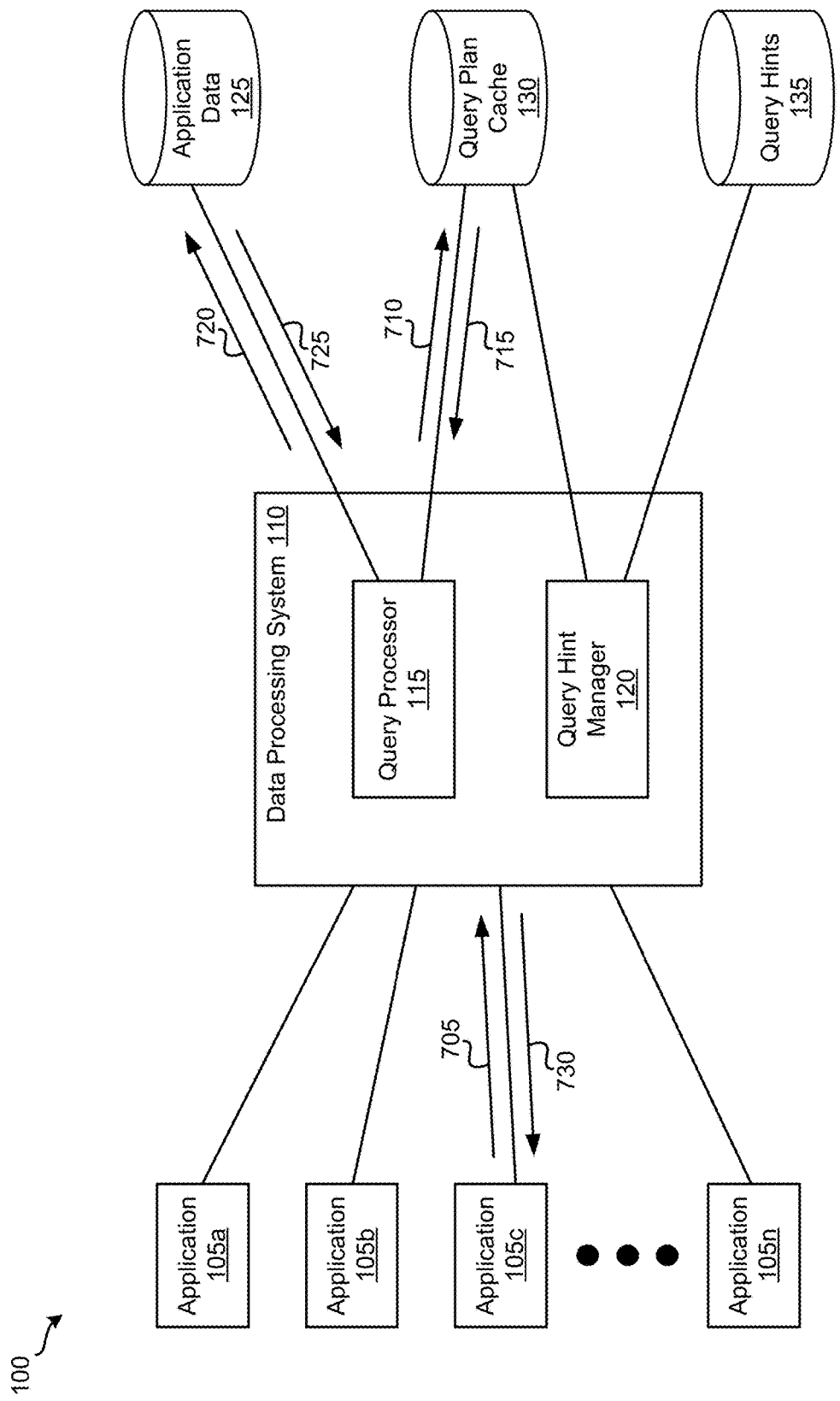
FIG. 7 illustrates another example query processing dataflow through the system illustrated in FIG. 1 according to some embodiments.

Another example query processing dataflow will now be described by reference to FIGS. 6 and 7. In particular, FIG. 7 illustrates an example query processing dataflow through the system illustrated in FIG. 1 according to some embodiments. At the start of this example, query plan cache storage 130 stores the queries execution plans illustrated in cache 400 of FIG. 6. The example query processing dataflow begins by application 105c sending, at operation 705, data processing system 110 a query for data from application data storage 125. In this example, the query is the same query that application 105a sends data processing system 110 in the above example described by reference to FIG. 3. That is, application 105c, in this example, and application 105a, in the above example described by reference to FIG. 3, are requesting the same data.

When query processor 115 receives the query, query processor 115 parses the query. Query processor 115 then checks whether query plan cache storage 130 includes a query execution plan for the query by sending, at operation 710, query plan cache storage 130 a request for a query execution plan associated with the query. As explained above, if query plan cache storage 130 has a query execution plan with a hash value that matches the hash value of the query string, query plan cache storage 130 returns the query execution plan. Otherwise, query plan cache storage 130 sends a response that it does not have a query execution plan for the query. As described in the above example by reference to FIG. 3, Query Plan 9 is the query execution plan associated with the query of application 105a and, thus, is also associated with the query of application 105c in this example. That is, the hash value associated with the Query Plan 9 is the same as the hash value of the query string of the query of application 105c. Thus, query plan cache storage 130 sends, at operation 715, Query Plan 9, which has Query Hint 6 applied to it, to query processor 115. Query processor 115 then executes the Query Plan with Query Hint 6 applied to it by accessing, at operation 720, application data storage 125 and retrieving, at operation 725, a result set for the query (which is the same result set as that described above by reference to FIG. 3). Finally, query processor 115 sends, at operation 730, the result set for the query to application 105c.

Figure 8:
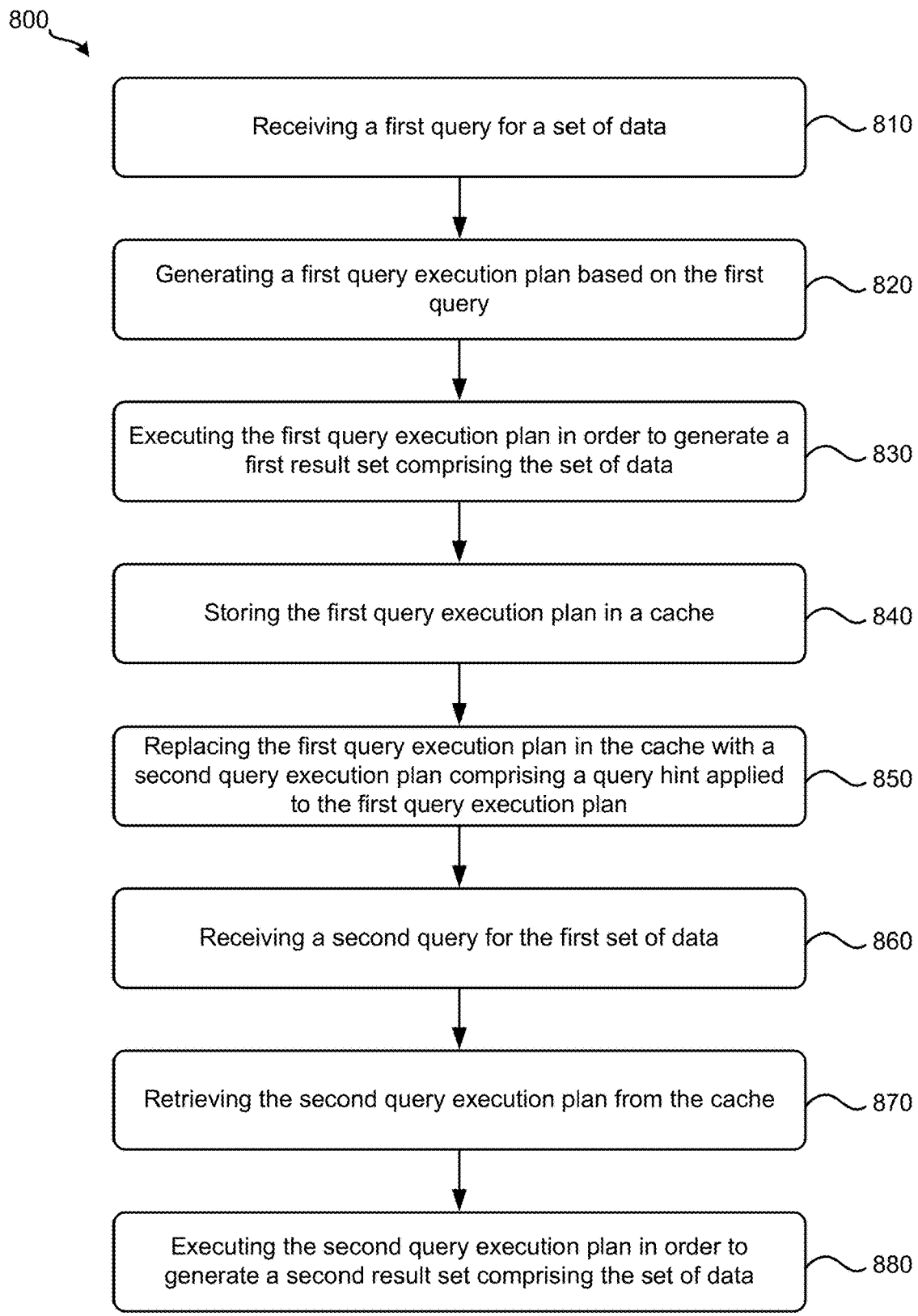
FIG. 8 illustrates a process for processing queries according to some embodiments.

FIG. 8 illustrates a process 800 for processing queries according to some embodiments. In some embodiments, data processing system 110 performs process 800. Process 800 begins by receiving, at 810 a first query for a set of data. Referring to FIG. 3 as an example, query processor 115 may receive the first query for the set of data from application 105a. Once process 800 receives the first query, process 800 parses the query. Next, process 800 checks whether query plan cache storage 130 includes a query execution plan for the query. If so, process 800 uses the query execution plan for the query stored in query plan cache storage 130. Otherwise, process 800 generates a query execution plan for the query.

In this example, query plan cache storage 130 does not include a query execution plan for the query. That is, the hash value of the query string of the query does not match the hash value associated with any of the query execution plans stored in query plan cache storage 130. Thus, at 820, process 800 generates a first query execution plan based on the first query. Then, process 800 executes, at 830, the first query execution plan in order to generate a first result set comprising the set of data. Referring to FIG. 3 as an example, query processor 115 may execute the first query execution plan by accessing application data storage 125 and retrieving the result set for the first query. Next, process 800 stores, at 840, the first query execution plan in a cache. Referring to FIG. 3 as an example, query processor 115 may sends the first query execution plan for the query to query plan cache storage 130 for storage and later use.

Process 800 then replaces, at 850, the first query execution plan in the cache with a second query execution plan comprising a query hint applied to the first query execution plan. In some embodiments, process 800 replaces the first query execution plan in the cache with the second query execution plan based on mappings between query statement hashes and query hints and/or mappings between query statement patterns and query hints. Referring to FIGS. 2, 4, 5, and 6 as an example, query hint manager 120 may replace Query Plan 9 in cache 400 illustrated in FIG. 4B with another query execution plan that includes Query Plan 9 and Query Hint 6, as illustrated in cache 400 of FIG. 6.

Next, process 800 receives, at 860, a second query for the set of data. Referring to FIG. 7 as an example, query processor 115 may receive the second query for the set of data from application 105*c*. Upon receiving the second query, process 800 parses the query. Process 800 then checks whether query plan cache storage 130 includes a query execution plan for the query. If so, process 800 uses the query execution plan for the query stored in query plan cache storage 130. Otherwise, process 800 generates a query execution plan for the query.

For this example, query plan cache storage 130 does include a query execution plan for the query. In other words, the hash value of the query string of the query matches the hash value associated with a query execution plans stored in query plan cache storage 130. In particular, the hash value of the query string of the query matches the hash value associated with the second query execution plan in this example. Accordingly, process 800 retrieves, at 870, the second query execution plan from the cache. Referring to FIGS. 6 and 7 as an example, query processing 115 may retrieve the Query Plan 9, which has Query Hint 6 applied to it, from cache 400, which is stored in query plan cache storage 130. Finally, process 800 executes, at 880, the second query execution plan in order to generate a second result set comprising the set of data. Referring to FIG. 7 as an example, query processor 115 can execute the second query execution plan by accessing application data storage 125 and retrieving the result set for the second query.

The above examples and embodiments illustrate applying query hints based on statement hashes and/or statement patterns. One of ordinary skill in the art will appreciated that additional and/or different attributes may be included in the mappings for query hints. For example, the mappings may include a version attribute that specifies a version of the data processing system. This way, different mappings may be defined for different versions of data processing system 110. As such, a particular version of data processing system 110 may utilize only the mappings that specify the particular version of the data processing system 110 to apply query hints to query execution plans.

Figure 9:
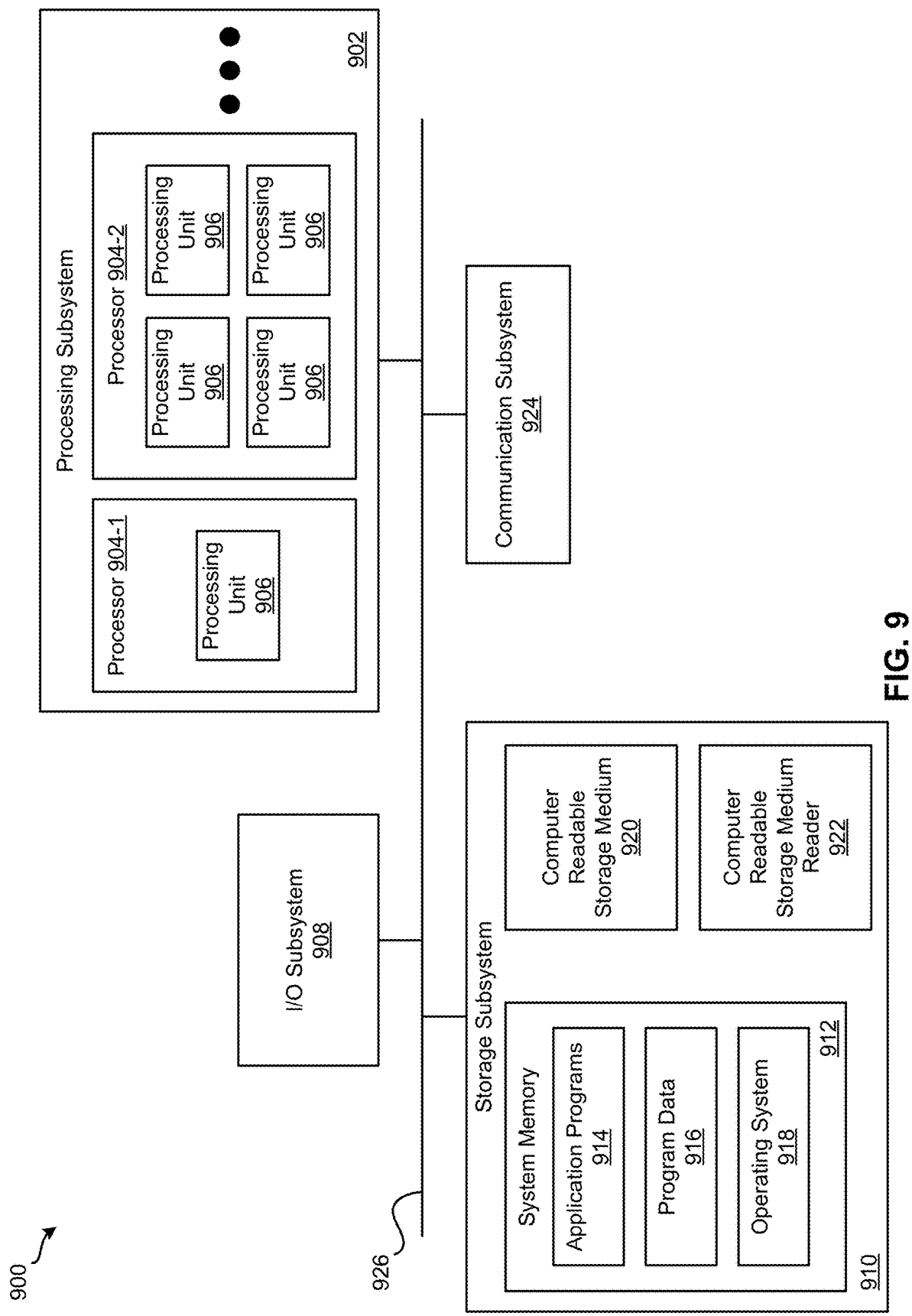
FIG. 9 illustrates an exemplary computer system, in which various embodiments may be implemented.

FIG. 9 illustrates an exemplary computer system 900 for implementing various embodiments described above. For example, computer system 900 may be used to implement data processing system 110. Computer system 900 may be a desktop computer, a laptop, a server computer, or any other type of computer system or combination thereof. Some or all elements of applications 105*a-n*, query processor 115, query hint manager 120, or combinations thereof can be included or implemented in computer system 900. In addition, computer system 900 can implement many of the operations, methods, and/or processes described above (e.g., process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., application 105a-n), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., applications 105a-n, query processor 115, and query hint manager 120) and/or processes (e.g., process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
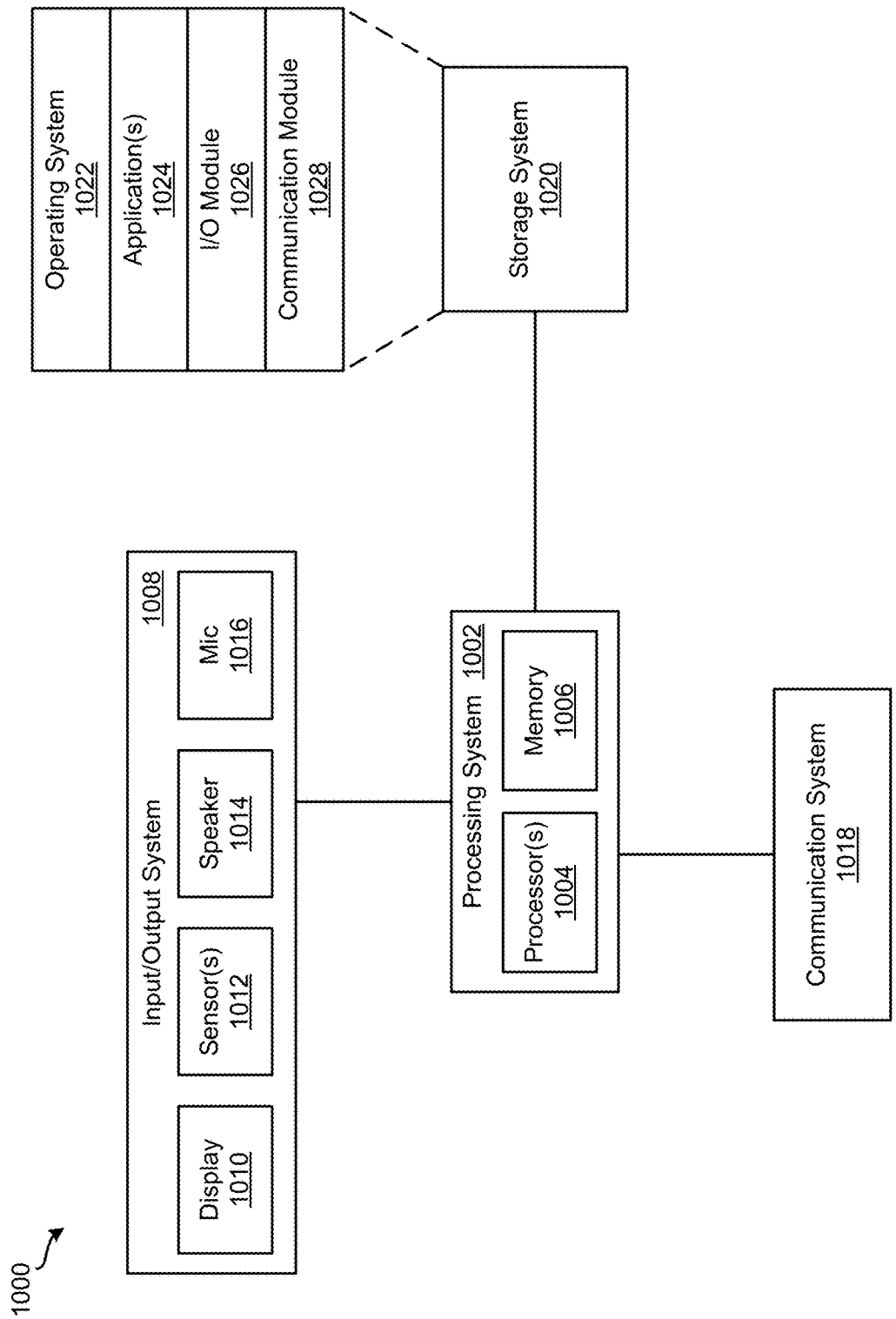
FIG. 10 illustrates an exemplary computing device, in which various embodiments may be implemented.

FIG. 10 illustrates an exemplary computing device 1000 for implementing various embodiments described above. Computing device 1000 may be a cellphone, a smartphone, a wearable device, an activity tracker or manager, a tablet, a personal digital assistant (PDA), a media player, or any other type of mobile computing device or combination thereof. Some or all elements of applications 105a-n, or combinations thereof can be included or implemented in computing device 1000. As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software. Many of the components (e.g., applications 105*a-n*) described above may be implemented as software that when executed by a processor or processing unit (e.g., processors 1004 of processing system 1002) performs the operations of such components and/or processes.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. For example, application 105 may be installed on computing device 1000. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
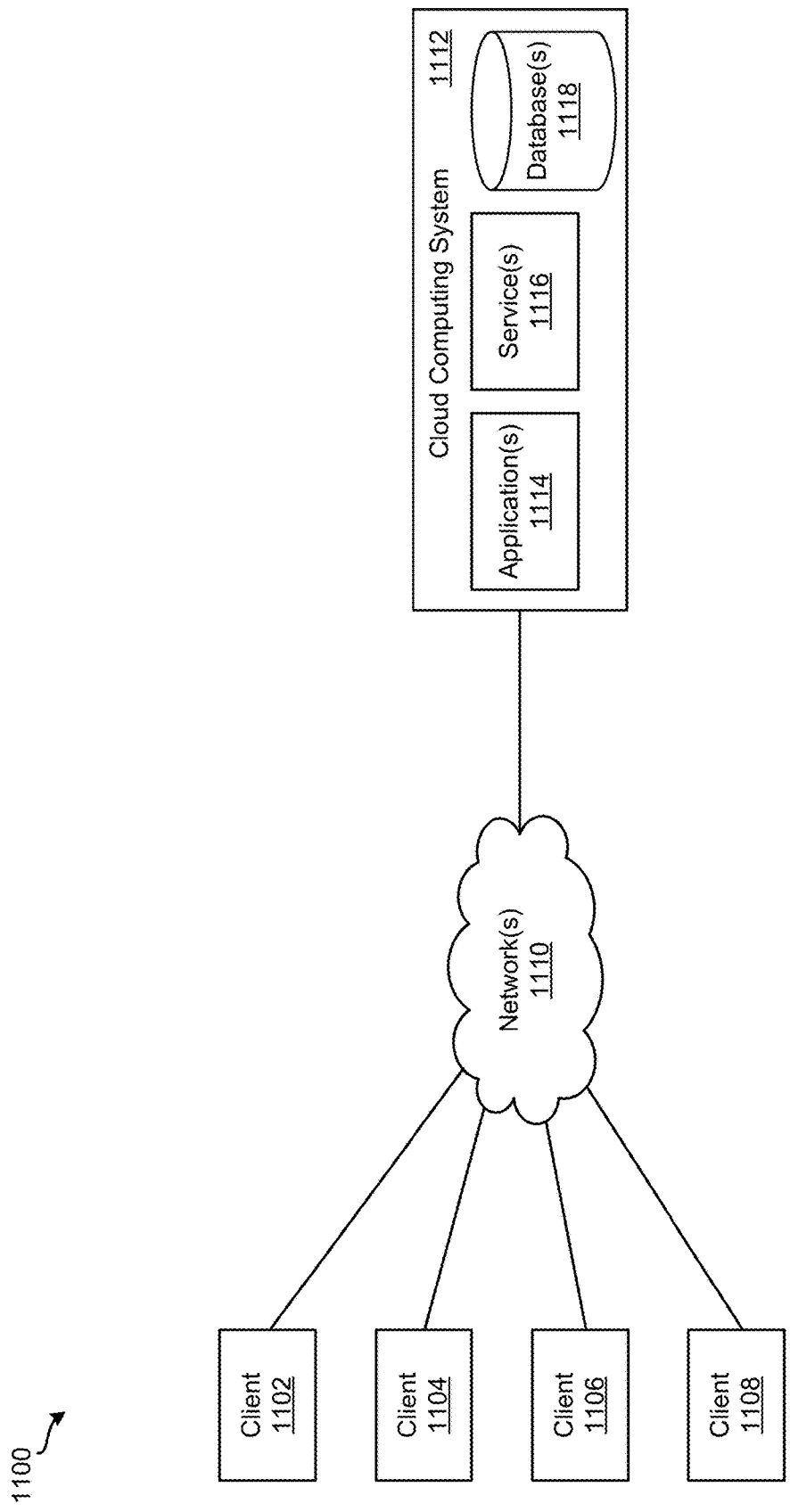
FIG. 11 illustrates system for implementing various embodiments described above.

FIG. 11 illustrates an exemplary system 1100 for implementing various embodiments described above. For example, cloud computing system 1112 of system 1100 may be used to implement data processing system 110. As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically provision, manage, and track a customer's subscriptions to services offered by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, storages 125-135 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processor of a computing device, the program comprising sets of instructions for:
   in response to receiving a first query for a set of data from a first application, generating a first query execution plan based on the first query;
   executing the first query execution plan in order to generate a first result set comprising the set of data;
   sending the first result set to the first application;
   storing the first query execution plan in a cache;

accessing a storage storing a first mapping between a query hash value and a first query hint and a second mapping between a query statement pattern and a second query hint;

upon determining that the hash value of the first query matches the query hash value of the first mapping, replacing the first query execution plan in the cache with a second query execution plan, wherein the second query execution plan comprises the first query hint applied to the first query execution plan;

upon determining that the first query includes a string that matches the query statement pattern of the second mapping, replacing the first query execution plan in the cache with a third query execution plan, wherein the third query execution plan comprises the second query hint applied to the first query execution plan;

in response to receiving a second query for the set of data from a second application, retrieving one of the second and third query execution plans that replaced the first query execution plan from the cache;

executing the one of the second and third query execution plans in order to generate a second result set comprising the set of data; and sending the second result set to the second application.

2. The non-transitory machine-readable medium of claim 1, wherein the program further comprises a set of instructions for:

before generating the first query execution plan, parsing the first query; and before retrieving the second query execution plan, parsing the second query.

3. The non-transitory machine-readable medium of claim 1, wherein replacing the first query execution plan with the second query execution plan is automatedly performed during runtime without human intervention.

4. The non-transitory machine-readable medium of claim 1, wherein the first query hint comprises a set of instructions specifying to include a set of operators in a particular query execution plan, wherein the second query execution plan further comprises the set of operators.

5. The non-transitory machine-readable medium of claim 1, wherein the first query hint comprises a set of instructions specifying to include a set of operators having a particular type in a particular query execution plan, wherein the second query execution plan further comprises the set of operators having the particular type.

6. The non-transitory machine-readable medium of claim 1, wherein the first query hint comprises a set of instructions specifying to use a particular type of query execution engine to execute a particular query, wherein executing the second query execution plan comprises using the particular execution engine.

7. The non-transitory machine-readable medium of claim 1, wherein the first query hint comprises a set of instructions specifying whether to use indexes in a particular query execution plan.

8. A method comprising:

in response to receiving a first query for a set of data from a first application, generating a first query execution plan based on the first query;

executing the first query execution plan in order to generate a first result set comprising the set of data;

storing the first query execution plan in a cache;

accessing a storage storing a first mapping between a query hash value and a first query hint and a second mapping between a query statement pattern and a second query hint;

upon determining that the hash value of the first query matches the query hash value of the first mapping, replacing the first query execution plan in the cache with a second query execution plan, wherein the second query execution plan comprises the first query hint applied to the first query execution plan;

upon determining that the first query includes a string that matches the query statement pattern of the second mapping, replacing the first query execution plan in the cache with a third query execution plan, wherein the third query execution plan comprises the second query hint applied to the first query execution plan;

in response to receiving a second query for the set of data from a second application, retrieving one of the second and third query execution plans that replaced the first query execution plan from the cache;

executing the one of the second and third query execution plans in order to generate a second result set comprising the set of data; and sending the second result set to the second application.

9. The method of claim 8 further comprising:

before generating the first query execution plan, parsing the first query; and before retrieving the second query execution plan, parsing the second query.

10. The method of claim 8, wherein replacing the first query execution plan with the second query execution plan is automatedly performed during runtime without human intervention.

11. The method of claim 8, wherein the first query hint comprises a set of instructions specifying to include a set of operators in a particular query execution plan, wherein the second query execution plan further comprises the set of operators.

12. The method of claim 8, wherein the first query hint comprises a set of instructions specifying to include a set of operators having a particular type in a particular query execution plan, wherein the second query execution plan further comprises the set of operators having the particular type.

13. The method of claim 8, wherein the first query hint comprises a set of instructions specifying to use a particular type of query execution engine to execute a particular query, wherein executing the second query execution plan comprises using the particular execution engine.

14. The method of claim 8, wherein the first query hint comprises a set of instructions specifying whether to use indexes in a particular query execution plan.

15. A system comprising:

a set of processors; and a non-transitory computer-readable medium storing instructions that when executed by at least one processor in the set of processors cause the at least one processor to:

in response to receiving a first query for a set of data from a first application, generate a first query execution plan based on the first query;

execute the first query execution plan in order to generate a first result set comprising the set of data;

store the first query execution plan in a cache;

access a storage storing a first mapping between a query hash value and a first query hint and a second mapping between a query statement pattern and a second query hint;

upon determining that the hash value of the first query matches the query hash value of the first mapping, replace the first query execution plan in the cache with a second query execution plan, wherein the second query execution plan comprises the first query hint applied to the first query execution plan;

upon determining that the first query includes a string that matches the query statement pattern of the second mapping, replace the first query execution plan in the cache with a third query execution plan, wherein the third query execution plan comprises the second query hint applied to the first query execution plan;

in response to receiving a second query for the set of data from a second application, retrieve one of the second and third query execution plans that replaced the first query execution plan from the cache;

execute the one of the second and third query execution plans in order to generate a second result set comprising the set of data; and send the second result set to the second application.

16. The system of claim 15, wherein the instructions further cause the at least one processor to:

before generating the first query execution plan, parse the first query; and before retrieving the second query execution plan, parse the second query.

17. The system of claim 15, wherein the first query hint comprises a set of instructions specifying to include a set of operators in a particular query execution plan, wherein the second query execution plan further comprises the set of operators.

18. The system of claim 15, wherein the first query hint comprises a set of instructions specifying to include a set of operators having a particular type in a particular query execution plan, wherein the second query execution plan further comprises the set of operators having the particular type.

19. The system of claim 15, wherein the first query hint comprises a set of instructions specifying to use a particular type of query execution engine to execute a particular query, wherein executing the second query execution plan comprises using the particular execution engine.

20. The system of claim 15, wherein the first query hint comprises a set of instructions specifying whether to use indexes in a particular query execution plan.

* * * * *